United States Patent

Ohki et al.

[11] Patent Number: 5,937,122
[45] Date of Patent: Aug. 10, 1999

[54] HIGH-REFLECTION ATTENUATING LIGHT INTERCEPTION APPARATUS

[75] Inventors: Kazuhiro Ohki; Yoshinori Satoh; Nobuaki Ema, all of Tokyo, Japan

[73] Assignee: Ando Electric Co., Ltd., Tokyo, Japan

[21] Appl. No.: 08/915,954

[22] Filed: Aug. 21, 1997

[30] Foreign Application Priority Data

Aug. 27, 1996 [JP] Japan ................................. 8-225667

[51] Int. Cl.⁶ ........................................................ G02B 6/36
[52] U.S. Cl. ............................ 385/78; 385/139; 385/140; 385/72; 385/93
[58] Field of Search ......................... 385/78, 79, 72, 385/60, 61, 88, 93, 140, 138, 139

[56] References Cited

U.S. PATENT DOCUMENTS

| 5,050,956 | 9/1991 | Carpenter et al. | 385/140 |
| 5,384,885 | 1/1995 | Diner | 385/140 |

FOREIGN PATENT DOCUMENTS

| 0 304 182 A2 | 2/1989 | European Pat. Off. |
| WO 91/10932 | 7/1991 | WIPO |

OTHER PUBLICATIONS

Houghton et al. (1987) Design Manufacture and Performance of Receptacle ( connectorised ) laser diode . . . , pp. 624–629 (1992).
Patent Abstracts of Japan, vol. 013, No. 032, Matsushita Electric Inc. Co., Ltd., 1988.
Patent Abstracts of Japan, vol. 015, No. 460, Nippon Telegr.& Teleph. Corp.), 1991.
Lenseless Fiber Stub Hermetically Sealed Potoelectronic Package, IBM Technical Disclosure Bulletin, vol. 37, No. 2B, pp. 599–601, 1994.

*Primary Examiner*—Phan T. H. Palmer
*Attorney, Agent, or Firm*—Darby & Darby

[57] ABSTRACT

A high-reflection attenuation light-interception apparatus having a measured optical plug (1) which is PC polished on its output terminal, a short ferrule (2) which has an internal graded index fiber (6) with a PC polished input terminal and diagonal polished output terminal, a receptacle (3) which directly connects the output terminal of the measured optical plug (1) and the input terminal of the short ferrule (2), a light-interception element which receives light propagated through the graded index fiber (6) in the short ferrule (2), and a light-interception element block which fixes in face to face relationship the output terminal of the short ferrule (2) and the receiving surface of the light-interception element (4).

8 Claims, 5 Drawing Sheets

(a)

(b)

HIGH-REFLECTION ATTENUATING LIGHT INTERCEPTION APPARATUS

FIELD OF THE INVENTION

The present invention relates to a high-reflection attenuation light-interception apparatus which receives an optical signal propagated through an optical fiber.

DESCRIPTION OF THE RELATED ART

The conventional high-reflection attenuating light-interception apparatus is explained referred to the Figures.

FIG. 5 is a cross section diagram of an example of a conventional high-reflection attenuating light receiving apparatus. The high-reflection attenuating light receiving apparatus shown in FIG. 5(a) is constructed from a measured optical plug 1 which anchors an optical fiber, a receptacle 101 which anchors the measured optical plug 1, a light-interception element 4 which receives the light, a light-interception element block 5 which anchors the receptacle 101 and a light-interception element 4.

In the apparatus shown in this Figure, because Fresnel reflection is produced in the output terminal of the measured optical plug 1, high-reflection attenuation cannot be realized. Here, as shown in FIG. 5(b), when a diagonally polished optical plug 1, i.e., a plug whose end is polished to have a diagonal surface, is used as the measured optical plug, Fresnel reflection can be suppressed, and high-reflection attenuation can be realized.

FIG. 6 is a cross section diagram of another example of a conventional high-reflection attenuating light-interception apparatus. The high-reflection attenuating light interception apparatus shown in FIG. 6 is constructed from a measured optical plug 1 which outputs light from the light source, an adapter 103 which anchors the measured optical plug 1, a pigtail optical module 104 in optical contact with the measured optical plug 1 and provided with an optical plug 104a which reduces Fresnel reflection, and an optical module anchoring block 105 which anchors the pigtail optical module 104.

Incidentally, in the light source which sends the optical signal to these conventional apparatuses, some are furnished with a function (hereinafter called a "shutdown function") that automatically decreases the output of the light source when Fresnel reflection is detected, preventing bodily exposure to laser energy.

However, in the conventional high-reflection attenuating light-interception apparatus shown in FIG. 5(b), because the Fresnel reflection is suppressed by using a diagonally polished optical plug 102 as the measured plug, it is possible that the shutdown function in the optical source will not activate, and as a result, a problem arises that the safety is compromised when the measured optical plug (the diagonally polished optical plug 102) is detached from the light-interception apparatus.

Additionally, in the high-reflective attenuating light-interception apparatus shown in FIG. 6, there is the problem that because the pigtail optical module 104 is disposed within the light-interception apparatus, when the optical plug 104a of the pigtail optical module is damages at the time of optical contact, the entire pigtail optical module 104 must be replaced, and the replacement cost becomes extremely high.

The aim of the present invention in consideration of this background is to present a high-reflection attenuating light-interception apparatus which can make steady and accurate measurements, and further, is safe and low cost.

SUMMARY OF THE INVENTION

The present invention comprises a measured plug which has the terminus of the optical fiber output terminal PC (physical contact) polished, i.e., have the end polished to have a hemispherical surface, short ferrule having an internal graded index fiber that is PC polished at the input terminal and diagonal polished at the output terminal, a receptacle which directly connects the output terminal of the measured optical plug and the input terminal of the short ferrule, a light-interception element which receives light propagated through the graded index fiber in the short ferrule, and a light-interception element anchoring block which anchors face to face the output terminal short ferrule and the optical reception surface of the light-interception elements.

Additionally, the present invention comprises a receptacle anchoring block which detachably anchors the receptacle with a screw to the light-interception element anchoring block in said high-reflection attenuating light-interception apparatus.

In addition, in the present invention, the PC polishing hemispherical surface is of a radius 10–60 mm in the high-reflection attenuating light-interception apparatus.

Finally, in the present invention the output terminal of the short ferrule and the receiving optical surface of the receiving light-interception elements are parallel.

DESCRIPTION OF THE PREFERRED EMBODIMENTS

Below, the embodiment of the present invention will be explained referring to the Figures.

Figure 1:
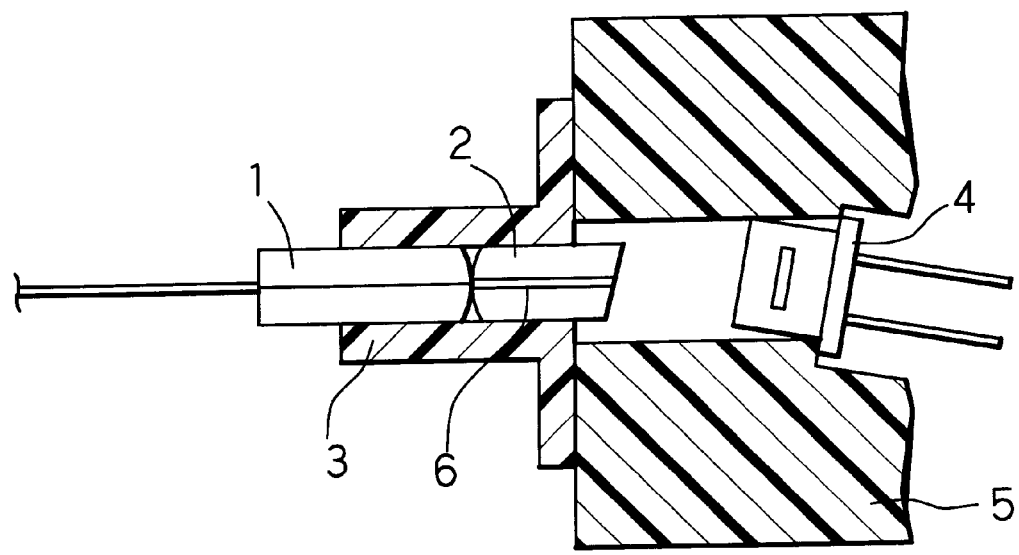
FIG. 1 is a cross-sectional diagram showing an example of the high-reflection attenuating light-interception apparatus of the present invention.

FIG. 1 is cross-sectional diagram showing an example of the high-reflection attenuation light-interception apparatus of the present invention. The high-reflection attenuation optical reception apparatus shown in FIG. 1 is constructed from a measured optical plug 1, a short ferrule 2, a receptacle 3, a light-interception element 4, and a light-interception element anchoring block 5.

The measured optical plug 1 anchors the optical fiber (hereinafter called "measured optical fiber"), and its output terminal is PC polished, i.e., formed with a spherical radius surface.

In the short ferrule 1 the input terminal is PC polished, and in the output terminal of the short ferrule 2, a diagonally polished, i.e., its end has a diagonal surface.

The PC polishing mentioned here is preferably accomplished by a spherical polisher that preferably forms a 20–60 mm radius on the fiber end. Any suitable apparatus can be used to form the curved surfaces of the fiber ends.

The receptacle 3 anchors the measured optical plug 1 and the short ferrule 2 to the light-interception apparatus. The light-interception elements 4 receive the light propagated through the graded index fiber in the short ferrule 2. Further, the light-interception element anchoring block 5 anchors face to face the output terminal of ferrule 2 and the light-interception surface of the light-interception element 4.

Figure 2:
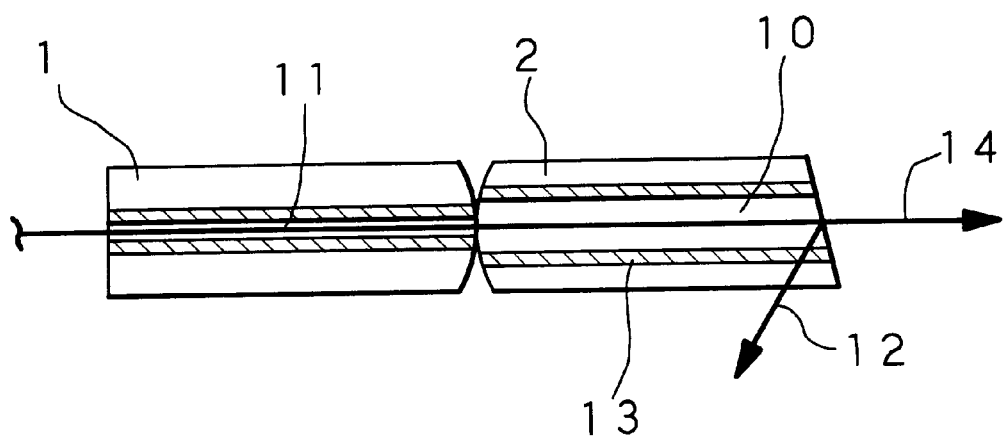
FIG. 2 is a cross-sectional diagram showing the principal of Fresnel reflection prevention in the high-reflection attenuation light-interception apparatus of FIG. 1.

In this apparatus, as shown in FIG. 2, the PC polished part of measured optical plug 1 and the PC polished part of short ferrule 2 are in optical contact. As a result, the light emitted from measured optical plug 1 has a lowered reflection and is propagated through the graded index fiber core 10.

Further, because a graded index fiber is used as the optical fiber within the short ferrule 2, the connection loss between the measured optical fiber core 11 and the graded index fiber core 10 can be minimized, and the accuracy of the measurement increased.

In addition, the light propagated through the core of the graded index fiber 10 generates Fresnel reflection 12 at the output terminal of the short ferrule 2, but because the output terminal of short ferrule 2 is diagonally polished this Fresnel reflection 12 can leak to the cladding 13 of the graded index fiber, and can realize high reflection attenuation. The measuring light 14 output from the graded index fiber 6 propagates further through the space, and the optical output at the time of propagation is received by light-interception element 4, and can be converted into an electrical signal.

Further, because the output terminal of the short ferrule 2 is diagonally polished, when the optical measuring plug 1 is attached to the light-interception apparatus, Fresnel reflection is prevented at the output terminal of the short ferrule, and the optical output at the time of propagation can be steadily and accurately measured.

In contrast, because the output terminal of the measured optical plug is diagonally polished, if the shutdown function is provided on the light source, when the measured optical plug 1 is removed from the light-interception apparatus, the shutdown function goes into operation, and the safety function will not fail.

Figure 3:
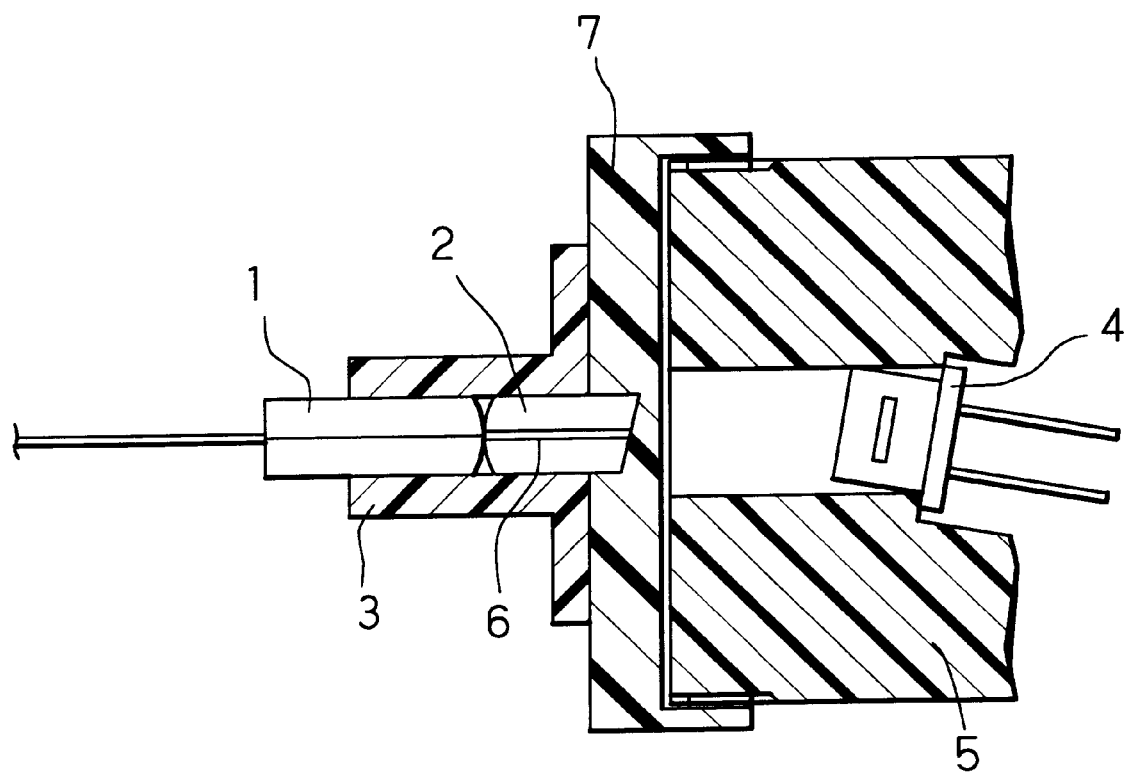
FIG. 3 is a cross-sectional diagram of another example of the high-reflection attenuating light-interception apparatus of the present invention.

As shown in FIG. 3, in the structure of FIG. 1 one can also consider disposing a receptacle anchoring block 7 to anchor the receptacle 3. In this case, by detachably anchoring with a screw, for example, the light-interception elements anchoring block 5 with the receptacle block 7, the receptacle 3, including the short ferrule 2, is easily replaced, and the replacement cost for the short ferrule 2 is reduced.

Figure 6:
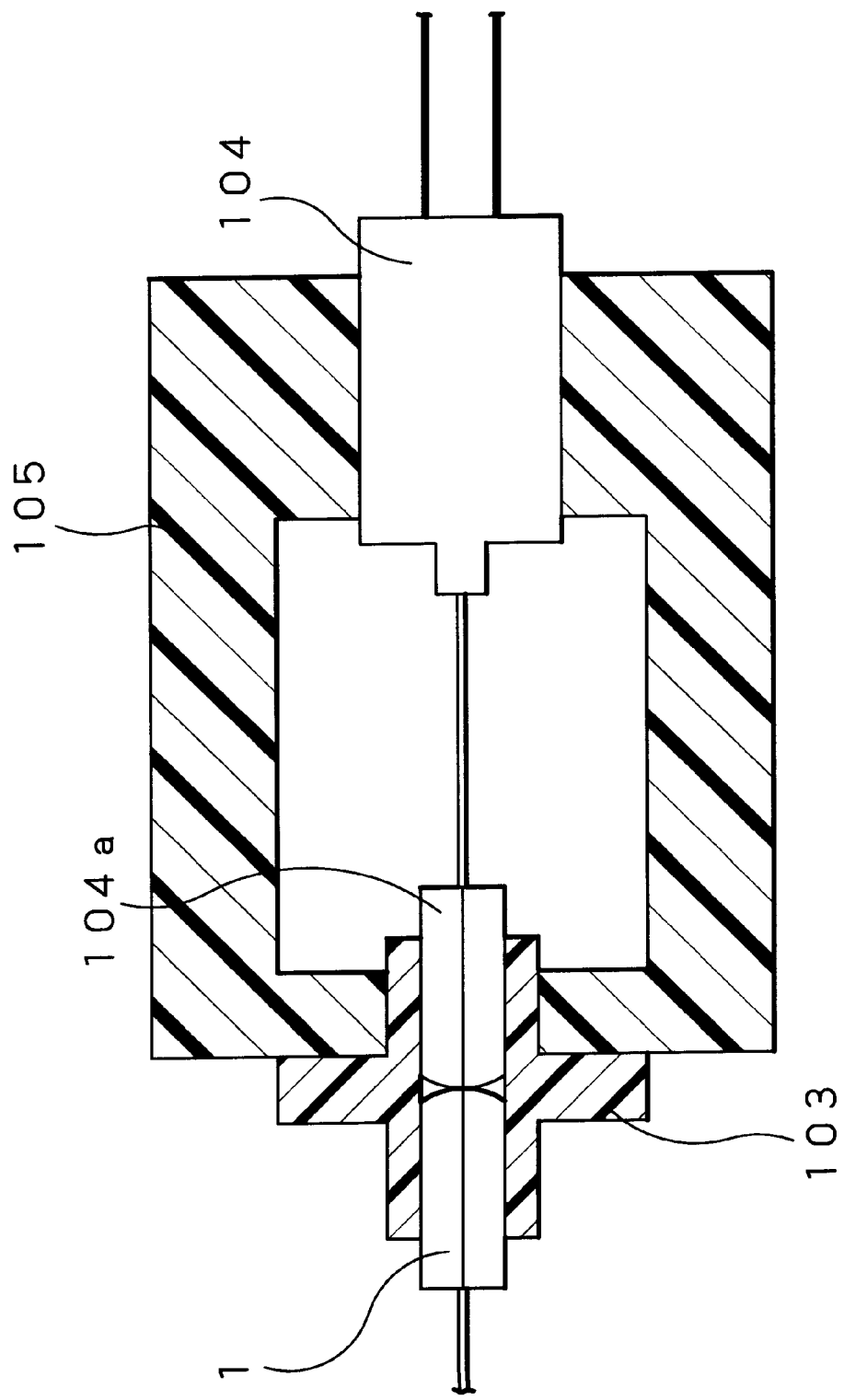
FIG. 6 is a cross-sectional diagram showing an example of a conventional high-reflection attenuating optical reception apparatus.

Additionally, in contrast to the conventional optical plugs 104a (see FIG. 6) which are one part of the pigtail optical module 104, because the short ferrule 2 is one independent unit, even if the short ferrule 2 is damaged at the time of optical contact, only the short ferrule 2 needs to be replaced, and the replacement cost is reduced.

Figure 4:
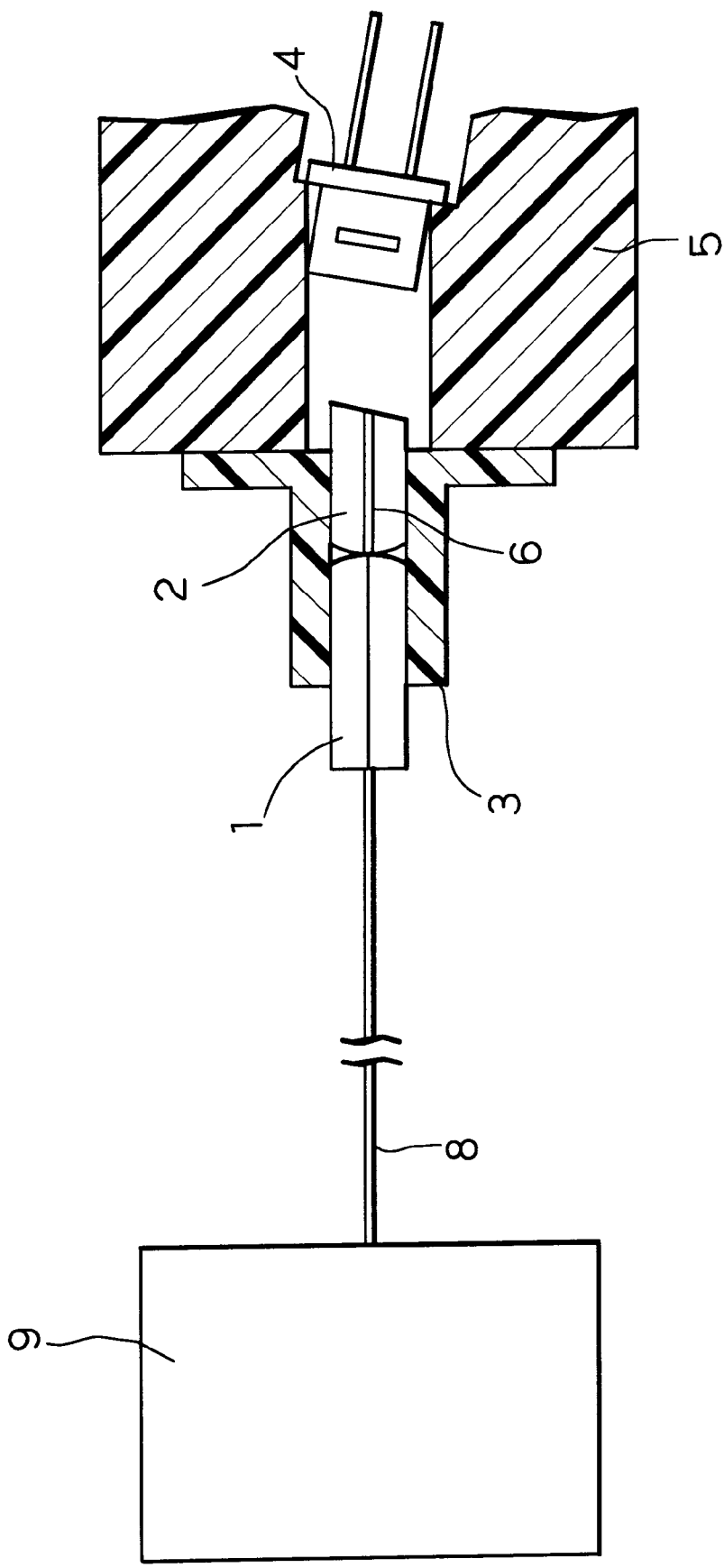
FIG. 4 is a cross-sectional diagram showing a detailed construction of the high-reflection attenuation light-interception apparatus of the present invention.
Figure 5:
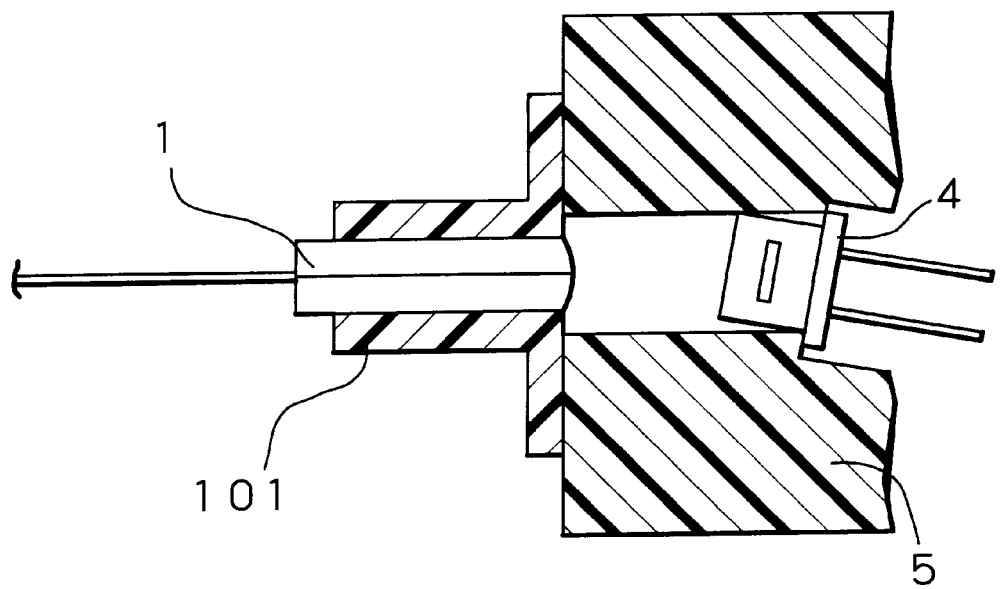
FIG. 5(a) is a cross-sectional diagram showing an example of a conventional high-reflection attenuating optical reception apparatus.
FIG. 5(b) is a cross-sectional diagram showing an example of a conventional high-reflection attenuating optical reception apparatus.
Figure 5:
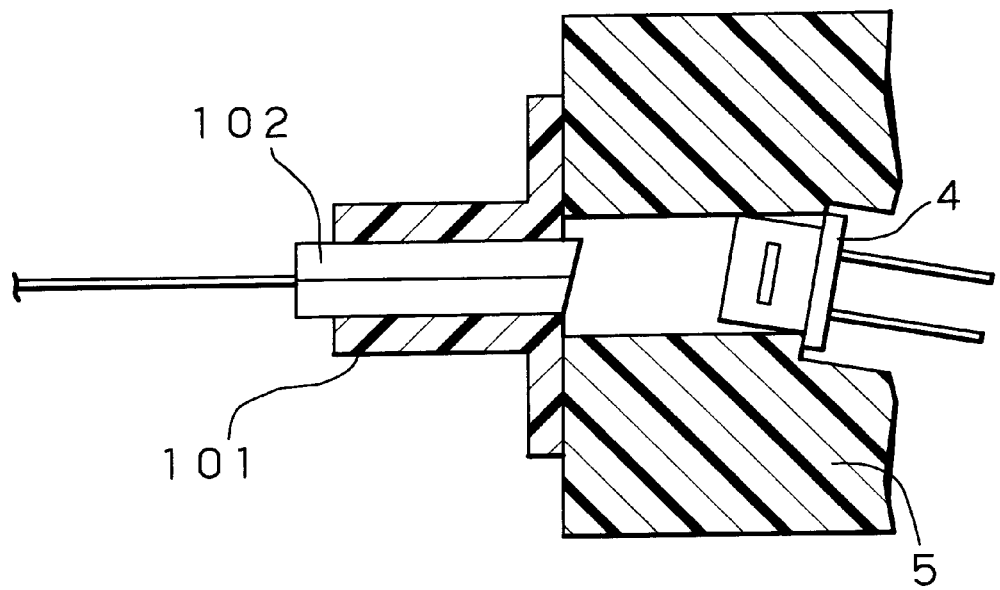

Next, the high-reflection attenuation light-interception device of the present invention will be explained using FIG. 4. FIG. 4 is a cross section diagram showing the details of the high-reflection attenuation light-interception apparatus of the present invention.

In FIG. 4, the optical fiber 8 which propagates the light from the light source 9 is a single mode fiber with a core diameter of 10 $\mu$m. At the terminal of optical fiber 8, the measured optical plug 1 is constructed, and at the output terminal of each measured optical plug 1, a PC polisher of greater than 40 dB operates. At the input terminal of short ferrule 2, a PC polisher of greater than 40 dB operates, and at the output terminal of the same short ferrule, diagonal polishing at 8° is preferred.

The graded index fiber 6 inside the short ferrule 2 is a multi-mode fiber having a core diameter of 50 $\mu$m. In addition, the light-interception elements are preferably light-interception elements of a diameter of 5 mm, and in order to suppress reflection on the light-interception surface, it is disposed at an 8° diagonal.

In the above-described construction, the reflection attenuation which returns to the light source 9 is above 37 dB. Also, because a multi-mode fiber having a core diameter of 50 $\mu$m is used as the graded index fiber, the direct loss with the optical fiber 8 (a single mode fiber) in the measured optical plug 1 is reduced to about 0.1 dB. Furthermore, because the core diameter (50 $\mu$m) of graded index fiber 6 is 5 times that of the core diameter (10 $\mu$m) of the optical fiber 8 when optical plug 1 is repeatedly quick disconnected, it is difficult to produce a connection miss between both fibers (the optical fiber 8 and the graded index fiber 6), and the repeatability of each quick disconnect is improved.

In addition, when light source 9 is provided with a shutdown function, when the measured optical plug 1 is removed from the present light-interception apparatus, each shutdown function operates, and the safety function will not fail. Furthermore, when installing the measured optical plug 1 into the light-interception apparatus, at the output terminal of the short ferrule 2, Fresnel reflection is prevented, and the optical output at the time of propagation can be steadily and accurately measured.

While the present invention has been explained in detail with reference to the Figures above, the concrete structure of the present invention is not limited to the embodiment described in the Figures, and the present invention includes a range of design changes omitted from the summary of the present invention.

What is claimed is:

1. A high-reflection attenuation light-interception apparatus comprising:

a measured optical plug formed of an optical fiber having a curved surface polished output terminal;

a short ferrule having an internal graded index fiber with a curved surface polished input terminal and diagonal polished output terminal;

a receptacle which directly connects said output terminal of said measured optical plug and said input terminal of said short ferrule;

a light-interception element to receive the light propagated through said graded index fiber inside said short ferrule; and a light-interception element anchoring block which fixes in face-to-face relationship said output terminal of said short ferrule and a light-interception surface of said light-interception element.

2. A high-reflection attenuation light-interception apparatus according to claim 1 wherein said curved surface polished output terminal of said optical plug and said input terminal of said short ferrule each has a spherical radius of 20–60 mm.

3. A high-reflection attenuation light-interception apparatus according to claim 1 wherein said short ferrule output terminal is diagonal polished at an angle of about 8°.

4. A high reflection attenuation light-interception apparatus comprising:

a measured optical plug formed of an optical fiber having a curved surface polished output terminal;

a short ferrule having an internal graded index fiber with a curved surface polished input terminal and diagonal polished output terminal;

a receptacle which directly connects the output terminal of said measured optical plug and the input terminal of said short ferrule;

a light-interception element to receive the light propagated by said graded index fiber inside said short ferrule;

a light-interception element anchoring block which fixes in face-to-face relationship the output terminal of said short ferrule and a light-interception surface of said light-interception element; and a receptacle anchoring block having a fastener which detachably anchors said receptacle to said light-interception element anchoring block.

5. A high-reflection attenuation light-interception apparatus according to claim 4 wherein said curved surface polished output terminal of said optical plug and said input terminal of said short ferrule each has a spherical radius of 20–60 mm.

6. A high-reflection attenuation light-interception apparatus according to claim 5 wherein the output terminal of the short ferrule and the light-interception surface of the light-interception element are parallel.

7. A high-reflection attenuation light-interception apparatus according to claim 4 wherein the output terminal of said short ferrule and the light-interception surface of said light-interception element are parallel.

8. A high-reflection attenuation light-interception apparatus according to claim 7 wherein said curved surface polished output terminal of said optical plug and input terminal of said short ferrule is of a spherical radius of 20–60 mm.

* * * * *